US012698055B2

(12) United States Patent
Curcio

(10) Patent No.: US 12,698,055 B2
(45) Date of Patent: Aug. 4, 2026

(54) WIND-POWERED ENERGY GENERATION SYSTEM FOR MULTI-HULL MARINE VESSELS

(71) Applicant: Mario Curcio, Hochdorf (CH)

(72) Inventor: Mario Curcio, Hochdorf (CH)

( * ) Notice: Subject to any disclaimer, the term of this patent is extended or adjusted under 35 U.S.C. 154(b) by 431 days.

(21) Appl. No.: 18/287,878

(22) PCT Filed: Apr. 14, 2022

(86) PCT No.: PCT/EP2022/060074
§ 371 (c)(1),
(2) Date: Oct. 21, 2023

(87) PCT Pub. No.: WO2022/223452
PCT Pub. Date: Oct. 27, 2022

(65) Prior Publication Data
US 2024/0367753 A1 Nov. 7, 2024

(30) Foreign Application Priority Data

Apr. 24, 2021 (EP) ..................................... 21020232

(51) Int. Cl.
| | |
|---|---|
| *B63B 1/12* | (2006.01) |
| *B63B 35/44* | (2006.01) |
| *B63H 13/00* | (2006.01) |
| *F03D 7/04* | (2006.01) |
| *F03D 9/25* | (2016.01) |

(52) U.S. Cl.
CPC .............. *B63B 1/121* (2013.01); *F03D 7/042* (2013.01); *F03D 9/25* (2016.05); *B63B 2035/446* (2013.01); *B63H 13/00* (2013.01); *F05B 2270/32* (2013.01)

(58) Field of Classification Search
CPC ... B63B 1/121; B63B 2035/446; F03D 7/042; F03D 9/25; F03D 3/005; F03D 9/32; F05B 2270/32; F05B 2240/932; B63H 13/00
See application file for complete search history.

(56) References Cited

U.S. PATENT DOCUMENTS

| | | | | |
|---|---|---|---|---|
| 9,003,631 | B2 * | 4/2015 | Yamamoto | .............. F03D 13/22 405/195.1 |
| 2020/0010155 | A1 * | 1/2020 | Robinson | ................ F03D 9/008 |
| 2020/0385093 | A1 * | 12/2020 | Gordon, II | .............. B63B 35/50 |

FOREIGN PATENT DOCUMENTS

| | | | | | |
|---|---|---|---|---|---|
| CN | 106114749 | A | * 11/2016 | ............. | B63B 1/121 |
| WO | WO-2021081775 | A1 | * 5/2021 | ............. | B65B 9/005 |
| WO | WO-2022122562 | A1 | * 6/2022 | ................ | B63J 1/00 |

* cited by examiner

*Primary Examiner* — Andrew Polay

(57) ABSTRACT

The present disclosure refers to a wind-powered energy generation system (100) for a multi-hull marine vessel (200) comprising at least two hulls (201), (202) and a bridge deck (203) connecting the at least two hulls (201), (202), where the energy generation system (100) comprises at least one wind turbine (101) located aft under the bridge deck (203) such as to be powered by airflow (150) passing under the bridge deck (203) from bow (204) to stern (205) of the vessel (200). A multi-hull marine vessel (200) comprising such an energy generation system (100) is herein also disclosed. A method of generating energy by wind-power for a multi-hull marine vessel (200) by such energy generation system (100) is herein also disclosed.

18 Claims, 3 Drawing Sheets

[Fig. 1]
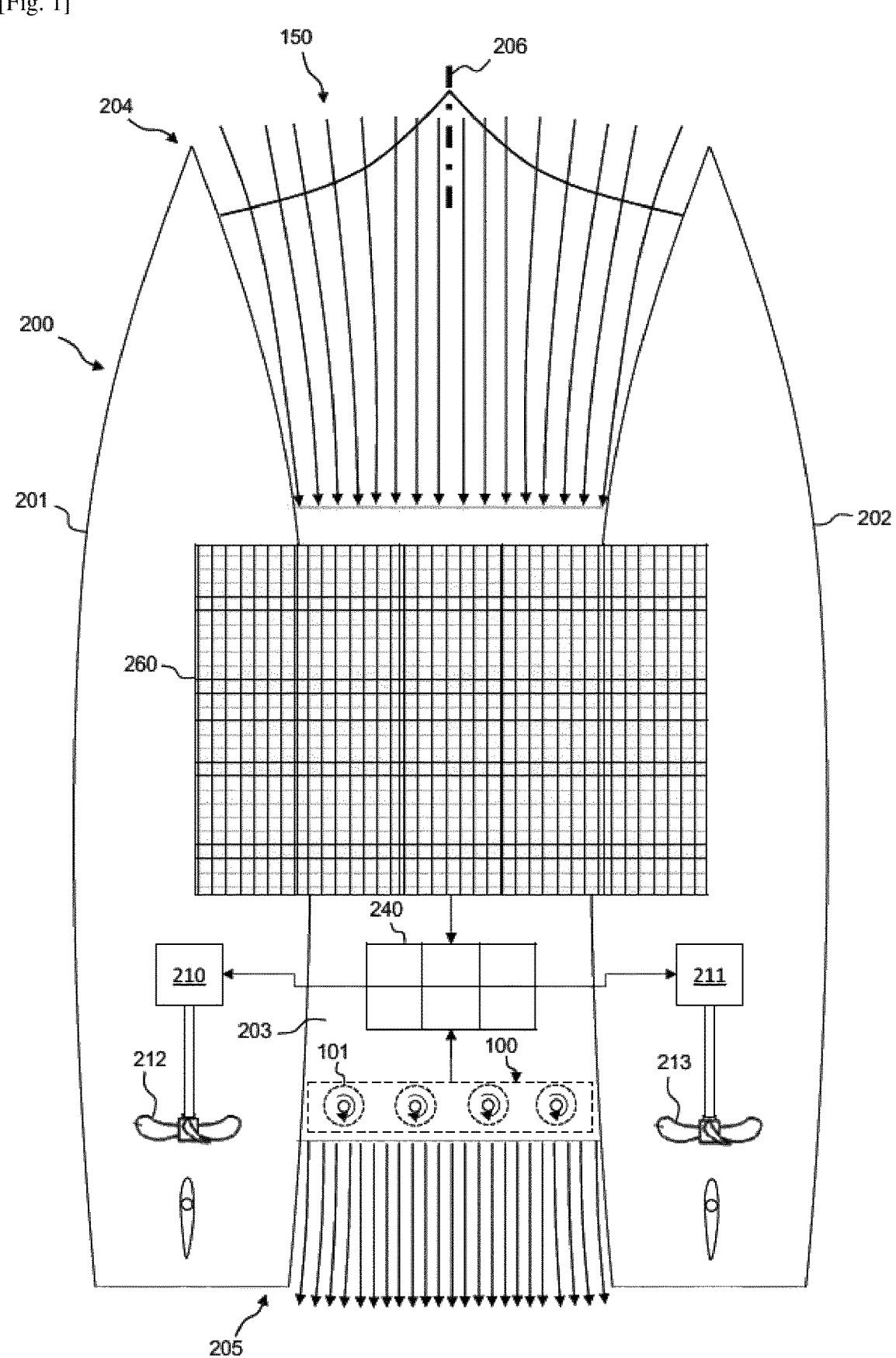

[Fig. 2]
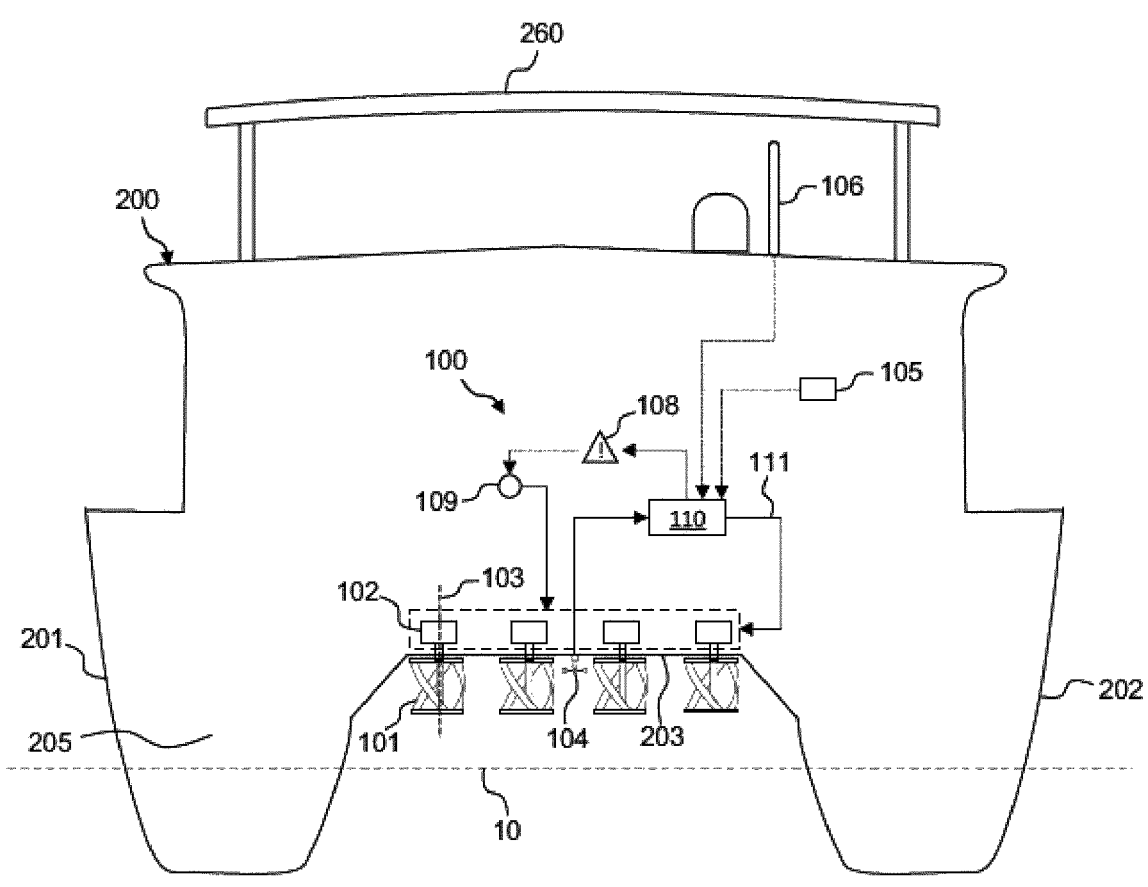

[Fig. 3]
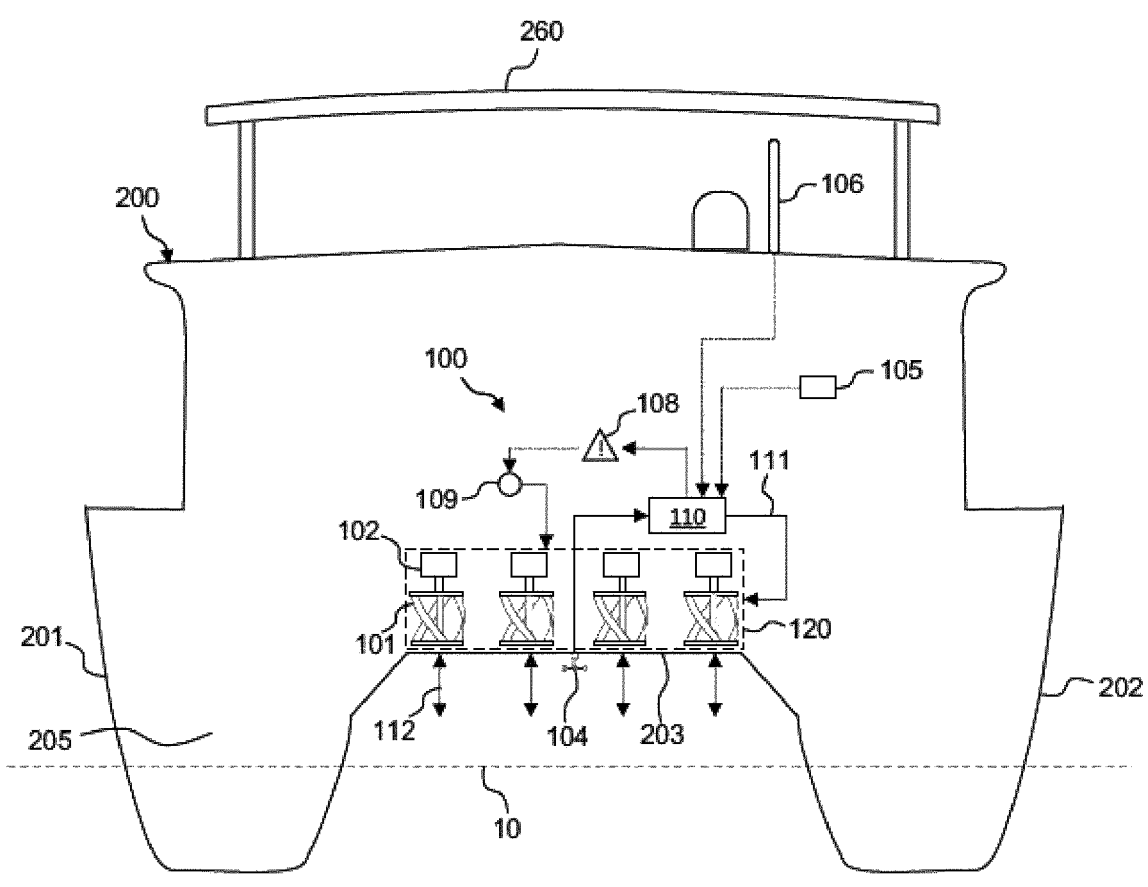

WIND-POWERED ENERGY GENERATION SYSTEM FOR MULTI-HULL MARINE VESSELS

FIELD OF THE INVENTION

The present disclosure relates to a wind-powered energy generation system for marine vessels, to a marine vessel comprising such a system and to a method of generating energy for marine vessels.

BACKGROUND

Marine vessels rely on battery power storage for onboard instrumentation and electric appliances. Sufficient electrical power availability at all times and for all needs can be a challenge, especially for high-power demanding uses like air conditioning, heating and the like, typically requiring intense use of a combustion-based generator. Thus, more and more often marine vessels comprise one or more renewable energy sources, such as solar panels, wind turbines and hydro-generators contributing to some extent to battery recharging and sustainable onboard living. In particular, there is a trend also in the yachting industry, like in the automobile industry, towards more ecological and sustainable solutions, which are based on the gradual replacement of combustion engines with electric motors and of fuel tanks with battery packs, thus using stored battery power also for propulsion, and almost exclusively renewable energy sources for recharging the batteries. Thus, the need for more power storage, for more energy sources, for faster and more efficient recharging, and for more efficient power management is higher and higher. Unlike combustion engines, electric motors are not coupled to alternators for recharging the batteries that are used to power them. Some of these vessels, especially those with a larger beam to length ratio, such as catamarans, can offer sufficient surface for installing solar panels and optionally wind turbines with sufficient power output for autonomous battery recharging. Current designs such as those from a leading manufacturer of solar yachts (Silent-Yachts) manage to achieve a power output of e.g. 17 Kwp on a 60-feet catamaran and 26 Kwp on a 80-feet catamaran, with solar panels alone, which can provide unlimited cruising range at certain vessel speeds, e.g. of about 6-8 Knots, at least in summer time. A combustion-based generator is typically provided as a backup solution for battery recharging in case of prolonged cast sky over several days or when increased speed is required over a prolonged time or during winter time and/or long night passages. Thus, wind turbines may contribute to meet the power demand, at least in sufficiently windy conditions, when solar energy is not available or insufficient.

However, wind turbines, do not typically bring a significant advantage on solar yachts, as they require additional space, they introduce injury risks and noise, and can possibly reduce the efficiency of the solar panels by casting a shadow on them.

General Description

In view of the above background, a wind-powered energy generation system for multi-hull marine vessels is herein disclosed that can be efficient at lower wind speeds, that is independent of available space, that does not interfere with eventual solar panels, that eliminates the risk of injuries and that reduces noise, that is out of sight when onboard and can become completely invisible when not used according to some embodiments.

In particular, a wind-powered energy generation system for a multi-hull marine vessel comprising at least two hulls and a bridge deck connecting the at least two hulls is disclosed, where the energy generation system comprises at least one wind turbine located aft under the bridge deck such as to be powered by airflow passing under the bridge deck from bow to stern of the vessel.

A multi-hull marine vessel comprising such an energy generation system and presenting the same advantages is herein also disclosed.

A method of generating energy by wind-power for a multi-hull marine vessel and presenting the same advantages is herein also disclosed.

These and other advantages will become apparent from the following description.

A "multi-hull marine vessel" according to the present disclosure is a vessel such as a boat, a yacht, a ship, a ferry or any other floating vessel, with at least two hulls such as a catamaran or three hulls such as a trimaran having a bridge deck connecting the at least two hulls, and adapted for navigation on water, such as ocean, sea, lake, river, regardless of its use, e.g. as a leisure vessel, or for commercial or dedicated use, e.g. as a charter yacht, a fishing boat, a ferry for transportation of people and/or other vehicles, a ship for transportation of goods, etc. . . . .

A "wind turbine" is a device with blades designed to use either drag and/or lift forces when placed in an air flow for rotating and thereby generating electrical power when coupled to a generator or alternator, typically a generator. Wind turbines are typically divided in two major types, according to their axis of rotation, either horizontal or vertical. Vertical axis turbines are typically categorized by their rotor type and different types are known like the Darrieus type, the Savonious type, the helical type, the H-Darrieus type. Although horizontal axis wind turbine are in general more efficient than vertical axis wind turbines, vertical axis wind turbines may have other advantages, like compactness, resulting in the possibility to have more wind turbines closer to each other, they are independent of wind direction and can be more simple in construction and easier to maintain.

The governing equation for the conversion of the kinetic energy of wind into rotational mechanical energy that generates electricity is: $P=\frac{1}{2}\,\rho AV^3\,C_p$ where P is the mechanical power extracted by the turbine in Watt [W], $\rho$ is the density of air in kg/m$^3$ (slightly variable based on altitude and temperature), A is the area of the rotor blades in m$^2$, V is the air velocity in m/s and $C_p$ is the power coefficient, a measure of the efficiency of the turbine that depends on the electric system, mechanical system and blade aerodynamic efficiency. It can be observed that the power generation increases with the cube of the velocity of the air flow, whereas the power output is only directly proportional to the blade surface. Thus, the ability to place the wind turbine where the air flow velocity is higher can be significantly advantageous, as it enables to generate more power while providing the opportunity to reduce the wind turbine size.

According to Betz's law there is a maximum power that can be extracted from the wind, independent of the design of a wind turbine in open flow, that is 59.3% of the wind kinetic energy. Practical utility-scale wind turbines achieve at peak 75-80% of the Betz's limit.

A diffuser-augmented wind turbine is a wind turbine modified with a cone-shaped wind diffuser that is used to increase the efficiency of converting wind power to electrical power, although still within the Betz's limit. The increased efficiency is possible due to the increased wind speeds the diffuser can provide.

The hulls of a multi-hull vessel have a shape that is hydrodynamic by design in order to flow through water with the least drag and is as such also aerodynamic. In particular, the sides of each hull converge at the bow and progressively expand going aft before narrowing at the stern. Also, the bow is typically higher above the water line with respect to the stern. In addition, typically, the bridge deck is shaped underneath in a way that is higher forward than aft with respect to the water line. The space between the at least two hulls under the bridge deck is thus tapered in a manner that it acts as a diffuser for an airflow passing under the bridge deck from bow to stern of the vessel. Thus, by arranging one or more wind turbines aft under the bridge deck more power can be generated, at parity of height above sea level, due to increased wind speed in that position. Given a certain wind speed at the height above the sea level where the at least one wind turbine is located, the air flow and hence the kinetic energy is greater when the bow is directed upwind. This is typically the case when the vessel is at anchorage.

When the vessel is underway, the kinetic energy of the air flow is the result of the apparent wind that includes the air flow due to the vessel speed and the true wind entering between the hulls under the bridge deck, the maximum being when the bow is directed upwind or when the wind comes from an angle in a range between about −45 and +45 degrees with respect to the vessel heading.

Thus, although at a given location and time wind is typically stronger at higher quotes above sea level, placing a wind turbine aft under the bridge deck of a multi-hull vessel, thanks to the diffuser effect provided by the vessel design, can result in a similar amount of power being generated as it was placed higher, without however all disadvantages mentioned in the background session. On the contrary, it can occupy a space that is otherwise unused, it cannot interfere with solar panels, it eliminates the risk of injuries as it is unreachable and even invisible from onboard, whereas from that position its operation is also less noisy. According to an embodiment it can even completely disappear when not used.

According to an embodiment, the energy generation system comprises at least one generator inside or above the bridge deck coupled to the at least one wind turbine under the bridge deck. This enables to have the wind turbine rotor as high as possible under the bridge deck and as far as possible from the water line, such as to avoid or reduce the possible impact of waves under the bridge deck, especially when the vessel is in navigation and/or in rough marine conditions.

According to an embodiment, the at least one wind turbine is retractable inside or above the bridge deck. This enables to retract the wind turbine when not used or usable, e.g. in absence of wind or in case of insufficient wind, or of too much wind, too wavy marine conditions and the like, and in general in case of lower power demand or sufficient power reserve or power generation by other energy sources. Thus, the at least one wind turbine can be made completely invisible also from outside, safe and silent, disappearing e.g. in a compartment in or on the bridge deck, e.g. in the cockpit area.

According to an embodiment, the at least one wind turbine is a wind turbine with vertical axis, resulting in a more compact and simpler design, in the possibility to arrange more wind turbines next to each other and in the possibility to make them more easily retractable according to an embodiment. Wind turbines with horizontal axis may be however used as well, embodied e.g. as diffuser-augmented wind turbines in order to further amplify the diffuser effect already provided by the multi-hull design.

According to an embodiment, the at least one wind turbine is a lift-based wind turbine such as of the helical type, Darrieus or H-Darrieus type. According to an embodiment, the at least one wind turbine is a Gorlov helical wind turbine.

According to an embodiment, the energy generation system comprises a plurality of wind turbines transversally distributed between the at least two hulls, e.g. 2, 3 or 4 wind turbines and possibly more, especially in case of a trimaran and in general depending on the size of the multi-hull vessel, and of the wind turbines.

Also, the energy generation system may comprise a generator for each wind turbine or a generator shared between more wind turbines, e.g. a common generator coupled in parallel via a gear mechanism to e.g. 2 or more wind turbines, thus combining the power of a plurality of wind turbines.

According to an embodiment, operation of the at least one wind turbine is manually activable/deactivable, e.g. by electronic control, such as to be activated, e.g. enabled to rotate and/or extracted, only when desired or needed or in favorable wind/marine conditions.

According to an embodiment, the energy generation system further comprises a controller configured to generate an alert for manual activation/deactivation of operation and/or is configured for automatically activating/deactivating operation of the at least one wind turbine based on actual wind speed, e.g. based on a feedback from an anemometer.

According to an embodiment, the energy generation system further comprises an anemometer under the bridge deck for measuring an actual wind speed under the bridge deck.

According to an embodiment, the controller is configured to generate an alert for manual activation/deactivation of operation and/or is configured for automatically activating/deactivating operation of the at least one wind turbine based on a feedback from any one or more other sensors or data sources, the data including any one or more of wind direction, wave direction, swell, yaw, pitch, roll, vessel speed, time of day, power reserve, actual power consumption, actual power charging rate. The list is not exhaustive.

According to an embodiment, the controller is further configured to automatically extract/retract the at least one wind turbine from/into the bridge deck.

The term "controller" as used herein encompasses any physical or virtual processing device and in particular a programmable logic controller running a computer-readable program or software provided with instructions to execute control operations related to the energy generation system such as any of, and not limited to, performing automatic activation/deactivation of operation of the at least one wind turbine, e.g. by enabling/disabling rotation of the at least one wind turbine, extraction/retraction of the at least one wind turbine, monitoring of performance (power generation) of the at least one wind turbine, monitoring of sensor data or other data and triggering of operation based on such data, generation of alerts, and the like.

According to an embodiment, the energy generation system further comprises a wind-shield mechanism, embodied e.g. as one or more tilting flaps, a rollable sheet or the like, under the bridge deck, such as to shield most of the air passage underneath and/or at the sides of the at least one wind turbine, when used, thereby increasing the diffuser-augmented effect by directing more air flow through the at least one wind turbine.

A multi-hull marine vessel comprising an energy generation system according to any of the above embodiments is herein also disclosed.

According to an embodiment, the multi-hull marine vessel further comprises a rechargeable battery pack and the energy generation system is configured to at least partially recharge the battery pack. According to an embodiment the battery pack comprises lithium-ion cells, but any other types of rechargeable batteries may in principle be used.

According to an embodiment, the multi-hull marine vessel further comprises at least one additional or main energy source to recharge the battery pack. According to an embodiment, the at least one main renewable energy source is a photovoltaic system.

According to an embodiment, the multi-hull marine vessel further comprises at least one electric motor, as propulsion system, powered by the battery pack, typically two motors for a catamaran, one for each of the two hulls, and typically one motor for a trimaran in the central hull. The at least one electric motor may be the sole propulsion system or the main or complementary propulsion system, e.g. in addition to a wind propulsion system in case of sailing multi-hull vessels.

The wind-powered energy generation system of the present disclosure is particularly suitable for electrically propulsed marine vessels using stored battery power also for propulsion, and almost exclusively renewable energy sources for recharging the batteries, thus with significantly increased power needs, where additional energy sources that are complementary to solar energy may be advantageous. Such an energy generation system can be particularly useful during night time or cast days or winter time, when solar energy is less available or not available at all, by enabling to extend the cruising range and/or to maintain a certain cruising speed and/or to satisfy a higher-power demand for uses like air conditioning, while reducing and possibly eliminating the need to use a backup combustion generator in order to recharge the batteries until solar energy is again available. Such energy generation system can be particularly convenient when the marine vessel is at anchor, especially during prolonged stays, or when sailing upwind, considering also the fact that when sailing upwind power consumption is also higher and can be thus efficiently compensated.

A method of generating energy by wind-power for a multi-hull marine vessel comprising at least two hulls and a bridge deck connecting the at least two hulls is herein also disclosed, the method comprising arranging at least one wind turbine aft under the bridge deck such as to be powered by airflow passing under the bridge deck from bow to stern of the vessel.

According to an embodiment, the method comprises coupling the at least one wind turbine under the bridge deck to a generator inside or above the bridge deck.

According to an embodiment, the method comprises retracting the at least one wind turbine inside or above the bridge deck when not used or usable, e.g. when not needed or when inconvenient.

According to an embodiment, the method comprises automatically generating an alert by a controller for manual activation/deactivation of operation or automatically activating/deactivating operation by the controller of the at least one wind turbine based on a feedback from any one or more sensors or data sources, the data including any one or more of wind speed, wind direction, wave direction, swell, yaw, pitch, roll, vessel speed, time of day, power reserve, actual power consumption, actual power charging rate.

According to an embodiment, the method comprises arranging an anemometer under the bridge deck for measuring an actual wind speed under the bridge deck.

According to an embodiment, the method comprises automatically extracting/retracting the at least one wind turbine from/into the bridge deck.

Other and further objects, features and advantages will appear from the following description of exemplary embodiments and accompanying drawings, which serve to explain the principles more in detail.

BRIEF DESCRIPTION OF THE DRAWINGS

FIG. 1 shows schematically a wind-powered energy generation system installed on a multi-hull marine vessel and its principle of operation according to the present disclosure, seen from the top.

FIG. 2 shows schematically a side view of the same wind-powered energy generation system and multi-hull marine vessel of [FIG. 1], with additional features, when looking at the stern of the vessel.

FIG. 3 shows schematically a variant of the embodiment of [FIG. 1] and [FIG. 2].

Skilled artisans appreciate that elements in the figures are illustrated for simplicity and clarity and have not necessarily been drawn to scale. For example, the dimensions of some of the elements in the figures may be exaggerated relative to other elements whereas other elements may have been left out or represented in a reduced number in order to enhance clarity and improve understanding of the embodiments of the present disclosure.

DETAILED DESCRIPTION

FIG. 1 shows schematically a wind-powered energy generation system 100 installed on a multi-hull marine vessel 200 and its principle of operation according to the present disclosure, seen from the top. In particular, the multi-hull marine vessel 200 is a catamaran comprising two hulls 201, 202, and a bridge deck 203 connecting the two hulls 201, 202. Each hull 201, 202 respectively comprises an electric motor 210, 211 as propulsion system, respectively connected to a propeller 212, 213. The marine vessel 200 further comprises a rechargeable battery pack 240 as electric power supply for the electric motors 210, 211 and other electrical onboard appliances (not shown) and a photovoltaic system 260 as main renewable energy source for recharging the battery pack 240. In particular, the wind-powered energy generation system 100 acts in this case as a complementary renewable energy source, comprising a plurality of wind turbines 101 transversally distributed between the two hulls 201, 202 located aft under the bridge deck 203 such as to be powered by an airflow 150 passing under the bridge deck 203 from bow 204 to stern 205 of the vessel 200.

As it can be seen from [FIG. 1], the sides of each hull 201, 202 converge at the bow 204 and progressively expand going aft before narrowing at the stern 205. Also, the bow 204 is typically higher above the water line with respect to the stern 205 (not shown). In addition, typically, the bridge deck 203 is shaped underneath in a way that is higher forward than aft with respect to the water line (not shown). The space between the hulls 201, 202 under the bridge deck 203 is thus tapered in a manner that it acts as a diffuser for the airflow 150 passing under the bridge deck 203 from the bow 204 to the stern 205 of the vessel 200. Thus, by arranging the wind turbines 101 aft under the bridge deck 203 more power can be generated, due to increased wind speed in that position. Given a certain wind speed at the height above the sea level where the wind turbines 101 are located, the air flow and hence the kinetic energy is greater when the bow 204 is directed upwind (facing the wind). This is typically the case when the vessel is at anchor 206.

The energy generation system 100 is configured to at least partially recharge the battery pack 240, typically connected to the battery pack 240 via an inverter (not shown).

FIG. 2 shows schematically a side view of the same wind-powered energy generation system 100 and multi-hull marine vessel 200 of [FIG. 1], with additional features, when looking at the stern 205 of the vessel 200. In particular, the energy generation system 100 comprises a generator 102 for each wind turbine 101, where the generators 102 are inside or above the bridge deck 203 and are coupled to the respective wind turbines 101 under the bridge deck 203.

This enables to have the wind turbines 101 as high as possible under the bridge deck 203 and as far as possible from the water line 10, such as to avoid or reduce the possible impact of waves under the bridge deck 203, especially when the vessel 200 is in navigation and/or in rough marine conditions. The wind turbines 101 of this example are wind turbines with vertical axis 103, e.g. helical wind turbines, e.g. of the Gorlov type.

It is at once apparent, that from this position, the wind turbines 101 cannot interfere with the solar panels 260, located far and higher on the upper deck. Also, the risk of injuries is eliminated as they are unreachable and even invisible from onboard, and they are also less noisy from this position.

The operation of the wind turbines 101 and hence of the energy generation system 100 can be manually activable/deactivable, e.g. by pressing of a start/stop electronic function 109 that acts on a mechanical brake system, or by manual actuation of a mechanical brake system (not shown), thereby enabling/disabling rotation of the wind turbines 101.

The energy generation system 100 further comprises a controller 110 configured to generate an alert 108 for manual activation/deactivation of operation 109 and/or configured for automatically activating/deactivating operation 111 of the wind turbines 101 based e.g., on actual wind speed.

In this case, the energy generation system 100 comprises an anemometer 104 under the bridge deck 203 for measuring an actual wind speed under the bridge deck 203. The position of the anemometer may be however different and the actual wind speed under the bridge deck 203 may be calculated by the controller 110, e.g. based on other data such as wind direction, vessel speed and vessel heading and the like.

Particularly, the controller 110 may be configured to generate an alert 108 for manual activation/deactivation of operation 109 and/or configured for automatically activating/deactivating operation 111 of the wind turbines 101 based on a feedback from any one any one or more other sensors or data sources 105, 106, the data including any one or more of wind direction, wave direction, swell, yaw, pitch, roll, vessel speed, time of day, power reserve, actual power consumption, actual power charging rate. The list is not exhaustive.

FIG. 3 shows schematically a variant of the embodiment of [FIG. 1] and [FIG. 2]. In particular, in addition to the features of [FIG. 2], the energy generation system 100 is further configured such that the wind turbines 101 are retractable inside or above the bridge deck 203, e.g. by a motorized or manual lift mechanism (not shown). Also, the controller 110 can be further configured to automatically extract/retract 112 the wind turbines 101, individually or together, from/into the bridge deck 203.

Manually and/or automatically activating/deactivating operation 109, 111 of the wind turbines 101, thus can include manually and/or automatically extracting/retracting the wind turbines 101. Thus, the wind turbines 101 can be retracted when not used or usable, e.g. in absence of wind or in case of insufficient wind, or of too much wind, too wavy marine conditions and the like, and in general in case of lower power demand or sufficient power reserve or power generation by other energy sources 260. Thus, the wind turbines can be made completely invisible, safe, silent, disappearing e.g. in a compartment 120 in or on the bridge deck 203, e.g. in the cockpit area.

With continued reference to [FIG. 1], [FIG. 2] and [FIG. 3] taken together, a method of generating energy by wind-power for a multi-hull marine vessel 200 comprising at least two hulls 201, 202 and a bridge deck 203 connecting the at least two hulls 201, 202 is herein also disclosed, the method comprising arranging at least one wind turbine 101 aft under the bridge deck 203 such as to be powered by airflow 150 passing under the bridge deck 203 from bow 204 to stern 205 of the vessel 200. The method further comprises coupling the at least one wind turbine 101 under the bridge deck 203 to a generator 102 inside or above the bridge deck 203.

The method can further comprise automatically generating an alert 108 by a controller 110 for manual activation/deactivation of operation 109 or automatically activating/deactivating 111 operation by the controller 110 of the at least one wind turbine 101 based on actual wind speed.

The method comprises arranging an anemometer 104 under the bridge deck 203 for measuring an actual wind speed under the bridge deck 203.

According to an embodiment, the method comprises automatically generating an alert 108 by the controller 110 for manual activation/deactivation of operation 109 or automatically activating/deactivating operation 111 by the controller 110 of the at least one wind turbine 101 based on a feedback from any one or more other sensors or data sources 105, 106, the data including any one or more of wind direction, wave direction, swell, yaw, pitch, roll, vessel speed, time of day, power reserve, actual power consumption, actual power charging rate. The list is not exhaustive.

According to an embodiment, the method comprises automatically extracting/retracting 112 the at least one wind turbine from/into the bridge deck 203, e.g. in a compartment 120 in or on the bridge deck 203.

In the preceding specification, numerous specific details have been described in order to provide a thorough understanding of the present disclosure. It will be apparent, however, to one having ordinary skill in the art that the specific details need not be employed to practice the present teaching. In other instances, well-known materials, parts, or methods have not been described in detail in order to avoid obscuring the present disclosure.

Particularly, modifications and variations of the disclosed embodiments are certainly possible in light of the above description. It is therefore to be understood, that within the scope of the appended claims, the invention may be practiced otherwise than as specifically devised in the above examples.

Reference throughout the preceding specification to "one embodiment", "an embodiment", "one example" or "an example", means that a particular feature, structure or characteristic described in connection with the embodiment or example is included in at least one embodiment. Thus, appearances of the phrases "in one embodiment", "in an embodiment", "one example" or "an example", in various places throughout this specification are not necessarily all referring to the same embodiment or example.

Furthermore, the particular features, structures, or characteristics may be combined in any suitable combinations and/or sub-combinations in one or more embodiments or examples.

The invention claimed is:

1. A wind-powered energy generation system arranged on a multi-hull marine vessel comprising at least two hulls and a bridge deck connecting the at least two hulls, wherein the energy generation system comprises at least one wind turbine located aft under the bridge deck such as to be powered by airflow passing under the bridge deck from bow to stern of the vessel and wherein the at least one wind turbine is retractable from under the bridge deck into or above the bridge deck.

2. The energy generation system according to claim 1 comprising at least one generator inside or above the bridge deck coupled to the at least one wind turbine under the bridge deck.

3. The energy generation system according to claim 1 wherein the at least one wind turbine is a wind turbine with vertical axis.

4. The energy generation system according to claim 1 wherein operation of the at least one wind turbine is manually activable/deactivable.

5. The energy generation system according to claim 1 comprising a controller configured to generate an alert for manual activation/deactivation of operation and/or configured for automatically activating/deactivating operation of the at least one wind turbine based on actual wind speed.

6. The energy generation system according to claim 5 further comprising an anemometer under the bridge deck for measuring the actual wind speed under the bridge deck.

7. The energy generation system according to claim 5 wherein the controller is further configured to generate an alert for manual activation/deactivation of operation and/or is configured for automatically activating/deactivating operation of the at least one wind turbine based on a feedback from any one or more other sensors or data sources, the data including any one or more of wind direction, wave direction, swell, yaw, pitch, roll, vessel speed, time of day, power reserve, actual power consumption, actual power charging rate.

8. The energy generation system according to claim 5 wherein the controller is further configured to automatically extract/retract the at least one wind turbine from/into the bridge deck.

9. The energy generation system according to claim 1 comprising a plurality of wind turbines transversally distributed between the at least two hulls.

10. A multi-hull marine vessel comprising a wind-powered energy generation system according to claim 1.

11. The multi-hull marine vessel according to claim 10 further comprising a rechargeable battery pack and wherein the energy generation system is configured to at least partially recharge the battery pack.

12. The multi-hull marine vessel according to claim 11 further comprising at least one additional or main energy source to recharge the battery pack.

13. The multi-hull marine vessel according to claim 11 further comprising at least one electric motor as propulsion system powered by the battery pack.

14. A method of generating energy by wind-power for a multi-hull marine vessel comprising at least two hulls and a bridge deck connecting the at least two hulls, the method comprising arranging at least one wind turbine aft under the bridge deck such as to be powered by airflow passing under the bridge deck from bow to stern of the vessel, and retracting the at least one wind turbine from under the bridge deck into or above the bridge deck when not used or usable.

15. The method according to claim 14 comprising coupling the at least one wind turbine under the bridge deck to a generator inside or above the bridge deck.

16. The method according to claim 14 comprising automatically generating an alert by a controller for manual activation/deactivation of operation or automatically activating/deactivating operation by the controller of the at least one wind turbine based on a feedback from any one or more sensors or data sources, the data including any one or more of wind speed, wind direction, wave direction, swell, yaw, pitch, roll, vessel speed, time of day, power reserve, actual power consumption, actual power charging rate.

17. The method according to claim 16 comprising arranging an anemometer under the bridge deck for measuring an actual wind speed under the bridge deck.

18. The method according to claim 14 comprising automatically extracting/retracting the at least one wind turbine from/into the bridge deck.

* * * * *